May 15, 1934.  F. S. BACON ET AL  1,959,323
MANUFACTURE OF SHOES AND ADHESIVES, PARTICULARLY FOR USE THEREIN
Filed March 17, 1932
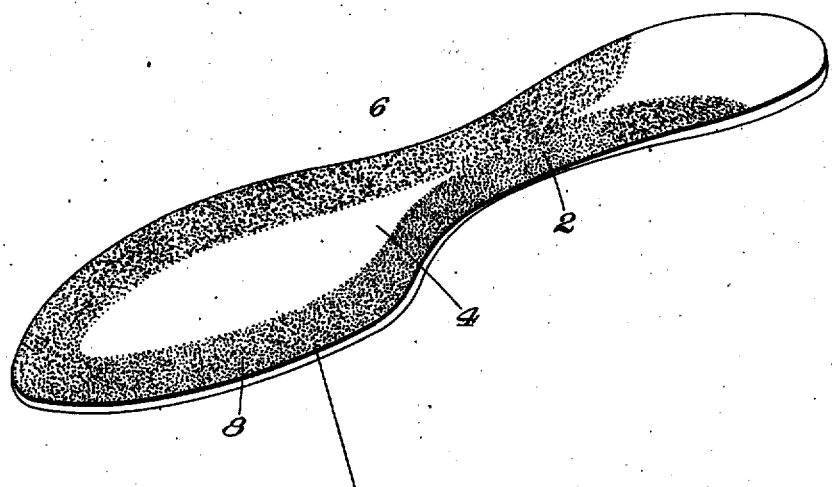
Adhesive composition containing pyroxylin of ½ second viscosity and pyroxylin of 18 seconds viscosity.
INVENTORS:
Frederick S. Bacon
Walter H. Nadyer
By their Attorney
Victor Coll Patented May 15, 1934

1,959,323

UNITED STATES PATENT OFFICE 1,959,323

MANUFACTURE OF SHOES AND ADHESIVES, PARTICULARLY FOR USE THEREIN

Frederick S. Bacon, Newton, and Walter H. Wedger, Belmont, Mass., assignors to Boston Blacking & Chemical Co., Boston, Mass., a corporation of Massachusetts Application March 17, 1932, Serial No. 599,426

20 Claims. (Cl. 12—142)

This invention relates to improvements in the cementing together of pieces of stock, particularly by means of cellulose derivative cements. The invention finds particular application in the cement-attaching of soles to shoe uppers, and is disclosed herein with reference thereto, though it should be understood that the invention in various of its phases is in no way limited to use in shoe manufacture.

In the manufacture of shoes wherein the soles are cement-attached to the uppers, it has been the practice to apply pyroxylin cement to the bottom of the lasted shoe, particularly to the overlasted marginal portion of the shoe upper and to the marginal portion of the attaching surface of the sole, and to permit the cement to dry. The cement on one or both of the shoe parts subsequently has been activated or cut with a softener, and the shoe parts then assembled and placed under pressure which is maintained while the cement is setting sufficiently to hold the shoe parts together.

While many million pairs of shoes have been manufactured in accordance with the aforementioned practice, the time required for the setting of the cement sufficiently to permit the removal of the pressure has necessitated maintaining the shoe parts under pressure for relatively long periods of time.

It is an object of this invention to provide improved cement of such a nature that it will exhibit sufficient adhesive strength to hold pieces of stock securely together even if they are retained under pressure for only a very short period and, moreover, will exhibit great adhesive strength after it is fully dried or hardened. As illustrated herein, this is accomplished by applying to a piece or pieces of stock a composition containing pyroxylin of very low viscosity, for example, ½-second, together with pyroxylin of what may be termed medium viscosity, for example, 18-seconds, both dissolved in a suitable pyroxylin solvent, permitting the cement to dry, subsequently cutting or softening the cement, and placing the pieces of stock together under pressure.

In another aspect, this invention comprises an improved method of securing together pieces of stock which requires the maintenance of the pieces of stock under pressure for only a very short period of time. As disclosed herein this is accomplished by applying to the sole and shoe upper a cement comprising both pyroxylin of very low viscosity and pyroxylin of medium viscosity and after the cement has hardened, and immediately prior to the assembly under pressure of the parts to be joined, cutting the cement on one or both of the parts with a non-viscous softener of the blanket type, such as is disclosed in an application for United States Letters Patent, Serial No. 508,368, filed January 12, 1931, in the name of Walter H. Wedger, or with a softener of the viscous type, such as is disclosed in an application for Letters Patent of the United States, Serial No. 583,773, filed December 29, 1931, in the name of said Wedger.

In another aspect, the invention contemplates a step product conveniently used in the practice of the method referred to above and comprising a sole having upon its attaching face a coating of dried cement containing pyroxylin of very low viscosity together with pyroxylin of higher viscosity.

In the drawing, the figure is a perspective view of a sole to which cement has been applied as a step in the practice of my invention and illustrates the step product above referred to.

An example of an adhesive composition made in accordance with my invention and given in proportions by weight as well as in approximate percentages is as follows:

| | Percent |
|---|---|
| 450 grams nitrocellulose of about 12% nitrogen content and about ½-second viscosity | 8 |
| 675 grams nitrocellulose of about 12% nitrogen content and about 18-seconds viscosity | 12 |
| 475 grams denatured ethyl alcohol | 9 |
| 3,900 grams ethyl acetate | 70 |
| 60 grams dibutyl phthalate | 1 |
| Total 5,560 grams | 100 |

This composition may be prepared by placing the above-recited ingredients in a suitable receptacle and rolling or otherwise agitating the receptacle for a period of 8 to 16 hours.

The viscosity characteristic of the nitrocellulose is referred to in terms of seconds in accordance with usual commercial practice, this viscosity being determined as described on pages 277–278 of a bulletin of the American Society for Testing Materials entitled "Tentative Specifications and Tests for Soluble Nitrocellulose" issued 1929, revised 1930. Further, the numerical value of the viscosity of the nitrocelluloses referred to herein, unless otherwise designated, relates to the present day commercial products the actual viscosities of which vary within limits in the neighborhood of 10%.

It will be noted that the nitrocelluloses referred to in the above composition, which contain about 12.0% nitrogen and are known in the art as soluble pyroxylins, constitute about 20% by weight of the composition. The pyroxylin content of the cement composition contemplated by this invention preferably comes within the range of 16 to 25% in order that the composition may have sufficient nitrocellulose or adhesive content, together with a viscosity such that the composition readily may be handled and applied to the stock. With such cellulose derivative content, moreover, the composition may be applied in a single layer to leather or other stock to impart the desired strength and character of bond. However, upon very porous leather and upon cloth fabrics and in certain other instances, it is frequently desirable to apply more than one coating of the adhesive composition. It is of course possible that in some cases it may be desirable to vary somewhat from the limits of pyroxylin content here-in specified.

Very advantageous results have been obtained both from the standpoint of adhesiveness or strength of the bond after pressure has been applied for only a short time, and after the cement has thoroughly set, by using the proportions of ½-second pyroxylin and 18-second pyroxylin present in the above example, namely, 40% of the former to 60% of the latter. In individual instances, however, these proportions may be varied through a relatively wide range, for example, from about 10 to 90% of ½-second pyroxylin and from about 90 to 10% of 18-second pyroxylin.

The pyroxylin of ½-second viscosity as employed in the above example apparently penetrates into the leather, cloth or other material to be adhesively secured, thereby providing a firm anchorage to such material and enabling the cement when completely set to exhibit a very high adhesive strength. This pyroxylin may have an actual viscosity ranging from about ¼-second, which is believed to be the lowest viscosity in commercial production at the present time, or less, to about 4-seconds.

The pyroxylin of about 18-second viscosity, when employed in a composition such as given above, appears not to penetrate substantially into the stock to be adhesively secured, such as leather, but to remain largely on the surface and to assist substantially in imparting very quickly sufficient adhesiveness to hold the shoe parts in assembled relation so that the assembled parts need be maintained under attaching pressure for only a very short period of time, a matter of one or two minutes, or, in some instances, even less. The actual viscosity of this pyroxylin may range from about 10-seconds upwardly, although pyroxylin having a viscosity in the neighborhood of that disclosed herein is usually preferred, in order that the composition may have the desired pyroxylin content for adhesive purposes without having imparted to it a viscosity so high as to make it difficult to handle and apply.

In certain instances, if desired, there may be employed pyroxylins of three or more different viscosities but in such cases at least two of the pyroxylins preferably come within the ranges outlined above.

The pyroxylin employed in making up the adhesive composition is ordinarily stabilized with denatured ethyl alcohol for greater safety in shipping and handling. The alcohol in the example of the adhesive composition given above represents substantially the usual quantity of stabilizing agent, this alcohol functioning in the adhesive composition as a diluent. Iso-propyl alcohol is another stabilizing agent sometimes employed which may also be used satisfactorily as a diluent, thereby making it unnecessary to remove the stabilizing agent before incorporating the pyroxylin in the adhesive composition. Other diluents may also be employed separately or in combination, for example, primary or secondary butyl alcohol, amyl alcohol, toluol, benzol, xylol, naphtha, etc.

The ethyl acetate (boiling point 77° C.) in the composition cited above serves as a solvent (at least in a colloidal sense) for the pyroxylins. In practice, ethyl acetate has been found to be exceedingly satisfactory when used alone as a solvent or in combination with other solvents. Mixtures of solvents may be utilized to control the rate of drying of the adhesive composition, to control "blushing", to regulate the viscosity of the composition as a whole and for other purposes. Thus, for example, butyl acetate (boiling point 125° C.) might be employed in conjunction with ethyl acetate. Butyl acetate lessens the tendency toward "blushing", increases the viscosity of the composition, and with its higher boiling point may be used to slow down the rate of drying of the adhesive composition where this effect is desired. Many other acetates, suitable for use as solvents individually or in combination with other solvents may be mentioned, for example, iso-propyl acetate, amyl acetate, iso-amyl acetate, and a solvent known commercially as pentacetate and comprising a mixture of several amyl acetates. The solvent possibilities are by no means limited to acetates, however, and many other suitable solvents may be mentioned, such as ethyl oxybutyrate, butyl lactate, ethyl lactate, and the mono-methyl and mono-ethyl ethers of ethylene glycol. Among the more volatile solvents may be mentioned acetone, and the oxides of the alkylene series, for example, di-ethylene oxide, which is a solvent for nitrocellulose in the presence of considerable alcohol, and is by itself a solvent for cellulose acetate. From the above it will be apparent that there is nothing critical about the solvent portion of the adhesive composition. Preferably, however, this solvent portion of the composition should not be such as to cause serious "blushing", a characteristic which is undesired by the trade.

Dibutyl phthalate is incorporated as a plasticizer in the illustrative composition given above in order that the adhesive may retain its flexibility for long periods of time. In some cases a plasticizer may be unnecessary and may be omitted but ordinarily it is preferred to incorporate a small amount of a plasticizer, such as dibutyl phthalate, which has been found not to affect adversely the exhibition of sufficient adhesive strength by the cement composition to hold the assembled shoe upper and sole together after the attaching pressure has been exerted for only a very short period of time. The dibutyl phthalate, which is a liquid boiling at about 340° C., is preferably employed as in the illustrative composition in the proportion of one part to about 20 parts of pyroxylin. While dibutyl phthalate is at present the preferred plasticizer, other plasticizing materials may be used, for example, others of the mono- or di-alkyl phthalates, camphor, or where less adhesive strength is required, eth-oxyethyl phthalate. Where manufacturing conditions are such that the pieces of stock to be adhesively joined may be maintained under pressure for relatively longer periods of time, plasticizers such as tri-phenyl phosphate or tri-cresyl phosphate may be used, these latter two plasticizers seemingly having the effect of increasing the time required by the cement composition to develop sufficient adhesive strength to hold the pieces of stock together without the aid of pressure.

As has been indicated above, the invention involves in one of its aspects the softening of the hardened cement immediately prior to the assembly of the parts to be joined with a non-viscous softener of the blanket type, or with a softener of the viscous type. A specific example of the non-viscous type softener, as disclosed in application Serial No. 508,368, is as follows:

300 cc. acetone
100 cc. ethyl ether
42 grams gum camphor
15 grams rezyl balsam
9 grams nitrocellulose of 330-seconds viscosity An illustrative composition of the viscous type of softener, as disclosed in application Serial No. 583,773, comprises 40 grams nitrocellulose of 1100-seconds viscosity
18 cc. denatured alcohol
900 cc. acetone A specific example of the manner in which our invention may be practiced in the manufacture of shoes will now be given. The shoes may be lasted in any usual or suitable manner, for example, with the overlasted portion of the shoe upper flat against the insole. Both the overlasted marginal portion of the upper and the marginal portion of the sole are roughened or scoured. A cement composition such as disclosed herein is then applied, preferably in a single layer, to the roughened portion of the sole and in a single layer to the overlasted portion of the shoe upper and is permitted to dry. As mentioned hereinbefore, more than one layer of cement, preferably two layers, are applied in the case of certain materials such as cloth fabric. The cement may desirably be applied, as illustrated in the drawing, to the marginal portions of the shank 2 and forepart 4 of the sole 6 in the form of a strip or ribbon 8 of suitable width by a sole cementing machine, such for example as that disclosed in United States Letters Patent No. 1,928,693, granted October 3, 1933, on an application of A. S. Johnson. Cement of our novel composition conveniently may be applied to the marginal portion of the shank and forepart of the shoe bottom by a shoe bottom cementing machine, such as shown in an application for Letters Patent of the United States, Serial No. 574,833, filed November 13, 1931, in the name of Wilbur L. MacKenzie. If desired, of course, the cement may be applied to the sole or to the overlasted portion of the shoe upper with a hand brush.

When it is desired that the sole be molded or conformed, the sole, after the application and hardening of the cement, is mulled or tempered and shaped. Before the softening or activating of the hardened cement on the sole, whether or not the sole is conformed or molded, the sole may be mulled or tempered in order to make the same more flexible and to reduce the tendency of the sole to pull away from the upper after the release of the sole attaching pressure.

The hardened cement on one or both of the shoe parts to be secured together is softened or activated, the cement on the sole only ordinarily being so treated. Cement softening or activating composition, if of the non-viscous "blanket" type, may be brought into contact with the dried cement on the sole to activate the same by means of an apparatus, for example, such as disclosed in the application for Letters Patent of the United States, Serial No. 396,554, filed October 1, 1929, in the name of C. E. Hood.

The activating composition may alternatively be of the viscous type, as disclosed above. This softening composition may be progressively applied to the cemented area 8 of the sole by means, for example, of a machine similar to that shown in said United States Letters Patent No. 1,928,-693, hereinbefore mentioned.

As quickly as practicable after the application of the softener to the sole, preferably within from 5 to 10 seconds, the sole and shoe are brought into assembled relation and placed under pressure and the pressure maintained until the cement has set sufficiently or become sufficiently adhesive to hold the shoe and shoe upper together after the pressure has been released. The shoe parts may be brought into assembled relation and maintained under pressure conveniently in a cement sole attaching machine, such as that shown in United States Letters Patent No. 1,897,-105, granted February 14, 1933, on an application of Milton H. Ballard.

With the procedure outlined above and the cement compositions disclosed hereinbefore and the softening compositions disclosed herein and in said applications, Serial No. 508,368 and Serial No. 583,773, it is possible to provide on a commercial scale a cemented union of sole to upper of great strength and at the same time safely to permit the removal of the assembled shoe from the sole attaching machine after the pressure has been applied for only about one to two minutes.

While we have specifically illustrated our invention in connection with soluble pyroxylin, it should be understood that the principles thereof may be applied to nitrocellulose in other forms. The invention, moreover, is applicable to other cellulose derivatives, such as cellulose esters and ethers, for example, cellulose acetate, ethyl cellulose and benzyl cellulose. By way of example an adhesive composition has been successfully employed which comprised 50 grams of a material known in the trade as low viscosity ethyl cellulose B, 35 grams of a material known in the trade as medium viscosity ethyl cellulose B, 360 grams of ethyl acetate, and 5 grams of dibutyl phthalate. A softener successfully employed with this cement comprised 40 grams of a material known in the trade as high viscosity ethyl cellulose B, and 825 grams ethyl acetate. By the use of this cement and softener in the manner previously indicated for attaching soles to shoe uppers with pyroxylin cement and softener, this ethyl cellulose cement exhibited sufficient strength after 70 seconds to hold a shoe upper and sole together after pressure was released and provided a bond of entirely satisfactory character.

Having described our invention, what we claim as new and desire to secure by Letters Patent of the United States is:

1. A step-product comprising a sole having upon its attaching face a single layer of a hardened adhesive composition including pyroxylin of less than about 4-seconds viscosity extending well into the fibers of the sole to form a firm anchorage thereto, and pyroxylin of from about 10 to about 18 seconds viscosity disposed largely upon the surface of the sole and adapted to adhere quickly to another adhesive treated shoe part after the adhesive composition has been softened and the shoe parts brought into juxtaposition under pressure.

2. A step-product comprising a sole having upon its attaching face a single layer of a hardened adhesive composition including pyroxylin of about ½-second viscosity extending well into the fibers of the sole to form a firm anchorage thereto and pyroxylin of about 18-seconds viscosity disposed mostly upon the surface of the sole and adapted to adhere quickly to another adhesive-treated shoe part after the adhesive composition has been softened and the shoe parts brought into juxtaposition under pressure.

3. That improvement in methods of securing together pieces of stock which comprises causing dissolved pyroxylin to penetrate into a piece of stock to form a firm anchorage thereto, causing additional dissolved pyroxylin to remain largely upon the surface of the stock, permitting the solvent for said pyroxylin to evaporate and the pyroxylin to harden, subsequently cutting said hardened pyroxylin with a volatile solvent and simultaneously forming a film over said solvent by an effective amount of film-forming constituent in the solvent to protect the same from too rapid evaporation, associating said pyroxylin treated piece of stock with another piece of stock, and bringing the parts together under pressure sufficient to break the film and permit the solvent rapidly to dissipate.

4. That improvement in methods of securing together pieces of stock which comprises applying to a piece of stock an adhesive composition containing dissolved cellulose derivative of very low viscosity and dissolved cellulose derivative of substantially higher viscosity, permitting said adhesive composition to harden, subsequently cutting said hardened adhesive composition with a relatively volatile solvent containing an amount of viscous cellulose derivative effective to form a film on the solvent, and bringing said piece of stock into contact with another piece of stock under pressure.

5. That improvement in methods of securing together pieces of stock which comprises applying to a piece of stock an adhesive composition containing dissolved pyroxylin of less than 4-seconds viscosity and dissolved pyroxylin of greater than 10-seconds viscosity, permitting said adhesive composition to harden, subsequently cutting the hardened adhesive composition with a relatively volatile pyroxylin solvent containing a relatively small quantity of high viscosity pyroxylin effective substantially to retard the volatilization of the solvent, and bringing said pieces of stock into contact with another piece of stock under pressure.

6. That improvement in methods of securing a sole to a shoe upper which comprises applying an adhesive composition containing dissolved cellulose derivative of low viscosity and dissolved cellulose derivative of substantially higher viscosity to the attaching face of the sole and to the attaching face of the shoe upper, permitting said adhesive composition to dry, cutting the hardened adhesive composition on one of said shoe parts with a relatively volatile solvent for the cellulose derivatives containing a relatively small quantity of high viscosity cellulose derivative effective substantially to retard the volatilization of the solvent, and bringing said shoe parts substantially immediately into contact under pressure.

7. That improvement in methods of manufacturing shoes which comprises applying to the attaching surfaces of a sole and a shoe upper an adhesive composition containing dissolved pyroxylin of about ½-second viscosity and dissolved pyroxylin of about 18-seconds viscosity, permitting said adhesive composition to harden, subsequently cutting the hardened adhesive composition on at least one of said shoe parts with a relatively volatile solvent for pyroxylin effective substantially to retard the volatilization of the solvent containing a relatively small quantity of high viscosity pyroxylin, and bringing said shoe parts substantially immediately together under pressure.

8. An adhesive composition containing dissolved cellulose derivatives to the extent of about 16 to 25% by weight and including a cellulose derivative of sufficiently low viscosity to penetrate substantially into shoe leather, and a cellulose derivative of sufficiently high viscosity to tend substantially to remain on the surface of the leather when the adhesive composition is applied to the leather.

9. An adhesive composition containing from about 16 to 25% by weight total dissolved pyroxylin and including pyroxylin capable of penetrating substantially into a stock to be cemented and containing also pyroxylin tending to remain substantially on the surface of the stock when the adhesive composition is applied thereto.

10. A cement composition containing nitrocellulose of about 12% nitrogen content and about ½-second viscosity, and nitrocellulose of about 12% nitrogen content and about 18-seconds viscosity.

11. A cement composition containing pyroxylin of about ½-second viscosity, pyroxylin of about 18-seconds viscosity, and a plasticizer.

12. A cement composition containing pyroxylin of about ½-second viscosity, pyroxylin of about 18-seconds viscosity, a solvent, and a plasticizer.

13. A cement composition containing soluble pyroxylin from 10 to 90% of which has a viscosity of about ½-second and from 90 to 10% of which has a viscosity of about 18 seconds.

14. A cement composition containing soluble pyroxylin in the proportions of about 4 parts of ½-second viscosity, and about 6 parts of about 18-seconds viscosity.

15. An adhesive composition comprising soluble pyroxylin to the extent of about 16 to 25% by weight of the composition and including pyroxylin of about ½-second viscosity and pyroxylin of about 18-seconds viscosity.

16. An adhesive composition comprising soluble pyroxylin to the extent of about 16 to 25% by weight of the composition and including pyroxylin of about ½-second viscosity and pyroxylin of about 18-seconds viscosity, together with plasticizing material to the extent of about 1% by weight of the composition.

17. A cement comprising soluble pyroxylin, alcohol, pyroxylin solvent, and a plasticizer, the pyroxylin content including pyroxylin of about ½-second viscosity and pyroxylin of about 18-seconds viscosity and being present in the proportion of about 20 parts of pyroxylin to about 1 part of plasticizer.

18. An adhesive composition containing in approximate proportions 8 parts by weight of pyroxylin of about ½-second viscosity, 12 parts of pyroxylin of about 18-seconds viscosity, and 1 part of a plasticizing material.

19. A cement comprising soluble pyroxylin, alcohol, pyroxylin solvent, and a plasticizer, the pyroxylin content constituting about 20 parts by weight of the cement and including pyroxylin of about ½-second viscosity and pyroxylin of about 18-seconds viscosity.

20. A fluid adhesive composition for use in attaching soles to shoe uppers of such a nature that a portion of a single coating of the adhesive applied to sole or upper leather penetrates well into the leather to form a firm anchorage thereto and a portion of the adhesive remains upon the surface of the leather, and of such a nature that the adhesive, upon subsequent re-activation after being applied to sole or upper leather and being permitted to dry, exhibits relatively high adhesive strength in partially dried condition, said fluid adhesive composition comprising from 16 to 25% by weight of pyroxylin dissolved in solvent material, approximately ⅖ of said pyroxylin having a viscosity of about ½ second and approximately ⅗ of said pyroxylin having a viscosity of about 18 seconds.

FREDERICK S. BACON.
WALTER H. WEDGER.

CERTIFICATE OF CORRECTION.

Patent No. 1,959,323.  May 15, 1934.

FREDERICK S. BACON, ET AL.

It is hereby certified that error appears in the printed specification of the above numbered patent requiring correction as follows: Page 4, lines 84, 85 and 86, claim 7, strike out the words "effective substantially to retard the volatilization of the solvent" and insert the same after "pyroxylin" in line 87, of said claim; and that the said Letters Patent should be read with this correction therein that the same may conform to the record of the case in the Patent Office.

Signed and sealed this 24th day of July, A. D. 1934.

Bryan M. Battey (Seal)  Acting Commissioner of Patents.

pyroxylin content constituting about 20 parts by weight of the cement and including pyroxylin of about ½-second viscosity and pyroxylin of about 18-seconds viscosity.

20. A fluid adhesive composition for use in attaching soles to shoe uppers of such a nature that a portion of a single coating of the adhesive applied to sole or upper leather penetrates well into the leather to form a firm anchorage thereto and a portion of the adhesive remains upon the surface of the leather, and of such a nature that the adhesive, upon subsequent re-activation after being applied to sole or upper leather and being permitted to dry, exhibits relatively high adhesive strength in partially dried condition, said fluid adhesive composition comprising from 16 to 25% by weight of pyroxylin dissolved in solvent material, approximately ⅖ of said pyroxylin having a viscosity of about ½ second and approximately ⅗ of said pyroxylin having a viscosity of about 18 seconds.

FREDERICK S. BACON.
WALTER H. WEDGER.

CERTIFICATE OF CORRECTION.

Patent No. 1,959,323.                                May 15, 1934.

FREDERICK S. BACON, ET AL.

It is hereby certified that error appears in the printed specification of the above numbered patent requiring correction as follows: Page 4, lines 84, 85 and 86, claim 7, strike out the words "effective substantially to retard the volatilization of the solvent" and insert the same after "pyroxylin" in line 87, of said claim; and that the said Letters Patent should be read with this correction therein that the same may conform to the record of the case in the Patent Office.

Signed and sealed this 24th day of July, A. D. 1934.

Bryan M. Battey (Seal)                                  Acting Commissioner of Patents.